(12) United States Patent
Spijkerman

(10) Patent No.: US 8,512,792 B2
(45) Date of Patent: Aug. 20, 2013

(54) METHOD AND APPARATUS FOR PRODUCING BLOCKS OF CHEESE

(75) Inventor: Harrie Spijkerman, Wapenveld (NL)

(73) Assignee: Tetra Laval Holdings & Finance S.A. (CH)

( * ) Notice: Subject to any disclaimer, the term of this patent is extended or adjusted under 35 U.S.C. 154(b) by 43 days.

(21) Appl. No.: 13/126,428

(22) PCT Filed: Oct. 30, 2009

(86) PCT No.: PCT/NL2009/050655
§ 371 (c)(1),
(2), (4) Date: Jun. 17, 2011

(87) PCT Pub. No.: WO2010/050812
PCT Pub. Date: May 6, 2010

(65) Prior Publication Data
US 2011/0262604 A1 Oct. 27, 2011

(30) Foreign Application Priority Data
Oct. 30, 2008 (NL) .................................... 2002153

(51) Int. Cl.
*A23C 19/00* (2006.01)
(52) U.S. Cl.
USPC ........... 426/582; 426/389; 426/495; 426/478; 426/512; 426/583; 425/85; 99/454; 99/456
(58) Field of Classification Search
USPC ................. 426/512, 389, 495, 478, 582, 583; 425/85; 99/454, 456
See application file for complete search history.

(56) References Cited

U.S. PATENT DOCUMENTS

| | | | |
|---|---|---|---|
| 4,664,924 A | * | 5/1987 | Sugisawa et al. ............. 426/242 |
| 5,082,681 A | * | 1/1992 | Barlow et al. ................. 426/495 |
| 5,773,054 A | * | 6/1998 | Meibach et al. ............... 426/36 |

FOREIGN PATENT DOCUMENTS

| | | |
|---|---|---|
| CA | 1040571 | 10/1978 |
| DE | 2346339 | 4/1975 |

(Continued)

OTHER PUBLICATIONS

R.S. Reinbold et al: "Dairy Foods—Pressure and Temperature During Vacuum Treatment of 290-Kilogram Stirred-Curd Cheddar Cheese Blocks" Journal of Dairy Science: American Dairy Science Association, US vol. 76 Apr. 1993, No. 4, pp. 909-913, XP000362999.

(Continued)

*Primary Examiner* — Drew Becker
*Assistant Examiner* — Preston Smith
(74) *Attorney, Agent, or Firm* — Finnegan, Henderson, Farabow, Garrett & Dunner, LLP

(57) ABSTRACT

A method for producing blocks of cheese from curd, wherein a curd mass is deposited in at least one cheese mold provided with a follower and in the at least one cheese mold is subjected to a vacuum treatment and pressing treatment, which pressing treatment is carried out while the at least one cheese mold is situated in a holder in which a vacuum prevails, wherein the vacuum treatment comprises at least a first and a second step, wherein in the first step in the holder with the aid of vacuum pump means a vacuum with a first vacuum pressure is created to draw air and whey entrained with the air from the curd mass, and in the second step the vacuum pressure in the holder is reduced further to a second vacuum pressure, which has a value at which the whey present in the curd mass starts to boil and residual air and free whey are pushed from the curd mass.

11 Claims, 3 Drawing Sheets

(56) References Cited

FOREIGN PATENT DOCUMENTS

| | | |
|---|---|---|
| EP | 0566520 A1 | 1/1993 |
| EP | 0566520 | 10/1993 |
| EP | 0742998 | 11/1996 |
| FR | 1431096 | 1/1966 |
| FR | 1431096 | 2/1974 |
| FR | 2190358 | 2/1974 |
| GB | 979168 | 1/1965 |

OTHER PUBLICATIONS

N.H. Robertson, et al: "The Influence of Pressing on the Composition and Quality of Gouda Cheese" South African Journal of Dairy Technology, 19730101 Pretoria, SA (1973) vol. 5, No. 1, pp. 17-22, XP000938427.

PCT/NL2009/050655 International Search Report, mailed Aug. 10, 2010.

Robertson, N.H., Dixon, A, and Nowers, J.H., "The Influence of Pressing on the Composition and Quality of Gouda Cheese," S. Afr. J. Dairy Technol., 1973, vol. 5, No. 1, 6 pages.

Reinbold, R.S., Hansen, C.L., Gale, M., and Ernstrom, C.A., "Pressure and Temperature During Vacuum Treatment of 290-Kilogram Stirred-Curd Cheddar Cheese Blocks," J. Dairy Sci. 76, 1993, 5 pages.

\* cited by examiner

METHOD AND APPARATUS FOR PRODUCING BLOCKS OF CHEESE

BACKGROUND OF THE INVENTION

The invention relates to a method for producing blocks of cheese from curd, wherein a curd mass is deposited in at least one cheese mold provided with a follower and in the at least one cheese mold is subjected to a vacuum treatment and pressing treatment, which pressing treatment is carried out while the at least one cheese mold is situated in a holder in which a vacuum prevails.

In cheese production processes, usually a pressing treatment is used to remove whey and air from a curd mass. The curd mass may for instance consist of fresh or already preacidified not yet coherent granular curd particles or assemblies of curd particles, for instance in the form of small lumps, strips or other shapes or, for instance, of a preformed curd block. Through the pressing treatment, a stabilized block is obtained, in that the curd particles adhere to each other. A coherent curd mass, the cheese block, is thereby created and on the outside of the block a rind is formed.

During the pressing treatment, a curd mass is contained in a cheese mold having one or more movable sides. Usually, that is the cover, but designs with movable bottom or sidewall are also possible. For the sake of simplicity, in the following, the starting point is the most common design, a cheese mold having a movable cover. On the movable cover, an external mechanical force is exerted by a pneumatic cylinder or the like.

Usually, the pressing treatment is carried out in a number of successive pressing steps, whereby first an excess of whey and air trapped in the curd mass is removed, and the curd mass is brought into the eventual block form defined by the cheese mold and the cover thereof. The curd particles are thereby pressed against each other for forming a coherent mass; and finally by compaction of the curd mass at the surface of the curd block a rind is formed.

Such a pressing treatment takes much time and requires much energy. In the past, many attempts have been made to accelerate the pressing treatment with the aid of a vacuum treatment and/or to reduce the energy needed therefor while maintaining a good quality of the eventual cheese blocks.

For instance in U.S. Pat. No. 5,082,681 a method for producing blocks of cheddar cheese is described, in which curd blocks obtained from a block former are brought under a high vacuum and then briefly pressed mechanically, while the gas pressure increases to atmospheric pressure, in order to obtain a rind on the block in a short time.

Further, from EP-B-1108362 a method for producing blocks of semihard cheese from fresh granular curd is known, in which, prior to an end pressing treatment under atmospheric pressure, a brief prepressing treatment under a high vacuum of 95% or more is applied to obtain an improved internal structure of the cheese blocks.

From EP 0 742 998 A1 a method of the above-described kind is known for producing blocks of cheese, in which curd is pressed under vacuum during a number of two or more cycles. In each pressing cycle, during a first phase of 20 to 25 minutes, a pressing pressure is exerted on the curd disposed in a cheese mold, while the cheese mold is situated in a vacuum space. Thereupon in a second phase of the respective pressing cycle the pressing pressure is removed and in the vacuum space a pressure is created which is equal to or greater than the atmospheric pressure. The second phase has a duration which is in the order of 30 seconds to two minutes. The pressing pressure may be a mechanically applied pressing pressure, but may also be generated by the difference between the ambient pressure and the vacuum pressure in the vacuum space.

SUMMARY OF THE INVENTION

The invention contemplates the provision of an improved method and apparatus with which more rapidly and/or with less energy consumption than with known techniques, blocks of cheese having a good internal and external structure can be produced.

According to the invention, to this end, a method of the above-described type is characterized in that the vacuum treatment comprises at least a first and a second step, wherein in the first step in the holder with the aid of vacuum pump means a vacuum with a first vacuum pressure is created to draw air and whey entrained with the air from the curd mass, and in the second step the vacuum pressure in the holder is reduced further to a second vacuum pressure, which has a value at which the whey present in the curd mass starts to boil and residual air and free whey are pushed from the curd mass.

It is noted that where in the description and the claims reference is made to a cheese mold, this is understood to encompass a so-called multiple cheese mold, in which several curd masses can be pressed simultaneously with the aid of several followers.

BRIEF DESCRIPTION OF THE DRAWINGS

In the following, the invention will be further elucidated with reference to the appended drawing.

DETAILED DESCRIPTION OF THE INVENTION

Figure 1:
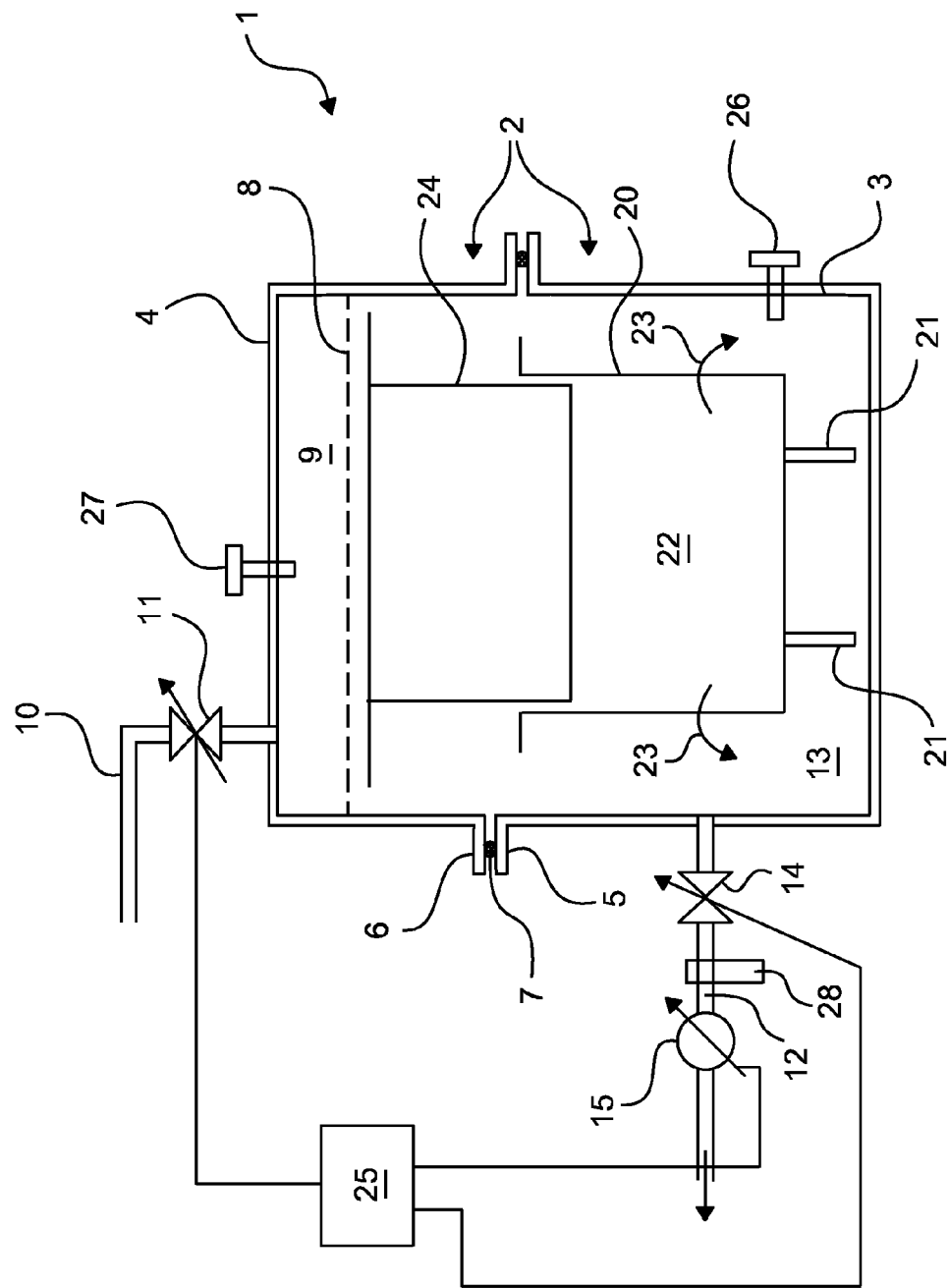
FIG. 1 schematically shows a vertical cross section of an example of an apparatus according to the invention for producing blocks of cheese.

FIG. 1 schematically shows in vertical cross section an example of an apparatus 1 according to the invention for producing blocks of cheese. It is noted that in the present description and claims reference is made to blocks of cheese. These do not need to be rectangular blocks. The term 'blocks' is understood to refer to all possible shapes of cheese. The apparatus shown comprises a box-shaped casing 2, which in this example comprises a lower and an upper part of hard material. The holder may be made of metal, for instance stainless steel, or a suitable plastic which is impermeable to air. The lower part 3 forms an open holder, which can be closed by the upper part 4 serving as cover. The lower and the upper part have suitably shaped mating edges 5 and 6, between which sealing material 7 is present for forming an airtight closure. Arranged in the cover is a gastight flexible wall 8, in this example in the form of a pliable membrane, which forms a closed air chamber 9 in the upper part of the cover. Alternatively, the air chamber may be provided with a movable rigid partition or stamp. In the context of this description and the claims, this embodiment is understood to fall within the term 'flexible wall'. The cover is furthermore provided with a pipe 10 terminating in the air chamber 9, having a suitable operable gas valve 11.

The lower part is likewise provided with a pipe 12 extending through the wall of the lower part, which terminates in the internal space 13 of the holder and which is provided with a suitable operable gas valve 14.

In the holder, as shown, a cheese mold 20 can be placed. To this end, if desired, use can be made of suitable supports 21. In operation, the cheese mold 20 is filled with a curd mass 22. It can consist of a preformed curd block, such as produced, for instance, by a so-called curd drainer and former for instance of the type Tetra Tebel Casomatic® or Tetra Tebel Pressvatic® or by a so-called block former, for instance of the type Tetra Tebel Blockformer®. The curd mass may also consist, for instance, of fresh granular curd, or of comminuted forms of composite predrained or acidified curd mass such as for instance the so-called curd strips, also named curd chips, from an acidifying machine as of the type Tetra Tebel Alfomatic®, poured into the cheese mold. The cheese mold 20 and the associated cover 24 conventionally have perforated walls, allowing whey and air to escape from the curd mass via the openings in the perforated walls. This is schematically indicated with the arrows 23.

Operatively resting on the curd mass 22, as is usual, is a movable cover 24 of the cheese mold. Such a cover is often called 'follower'.

In operation, the top of the cover of the cheese mold abuts against the membrane 8, which bounds the air chamber 9 in the holder cover 4.

According to the invention, the above-described apparatus can be used as follows to produce a cheese block.

After the cheese vat 20 filled with curd has been placed in the holder 2 and the holder has been closed, in a first step the holder 2 is vacuumized to a first vacuum pressure with vacuum pump means 15 via the pipe 12 and the then open valve 14. Further, if desired depending on the type of cheese, at the same time also the air chamber 9 may be briefly vacuumized via pipe 10 and the then open valve 11 or via a separate pipe with valve, to prevent the residual air present in this air chamber from causing the membrane 8 to move down and exerting pressure via the subjacent cover 24 on the curd mass 22. The connection of pipe 10 and vacuum pump means 15 and valve necessary for this purpose is not represented in FIG. 1. As a result of the pressure around the cheese mold decreasing, also an air flow is created from the interior of the curd mass and via the openings in the walls of the cheese vat to the outside, as indicated with the arrows 23. This air flow also entrains whey from the curd mass. Accordingly, during the first step air and whey are drawn from the curd mass.

During this step the valve 11 in the pipe 10 connected with the air chamber 9 may be open or closed. For some types of cheese it is useful to open the valve 11. This can be done directly at the beginning of the first step or a short time after that. In that case, the air chamber expands in that the pliable membrane 8 is stretched under the influence of the large pressure difference between the interior of the air chamber 9, where the ambient pressure prevails, and the interior of the holder. The membrane 8 thereby presses against the top of the follower 24, so that the curd mass in the cheese mold is compressed. In this way, air and whey can be squeezed from the curd mass in an accelerated manner.

To obtain a type of cheese with a wholly or virtually wholly closed texture (a blind cheese), that is, a cheese without air or whey inclusions, then, advantageously, during a second step the pressure in the holder may be reduced further to a lower second vacuum pressure so that the whey still present starts to boil if the boiling temperature as a result of the vacuum applied has been lowered to the whey temperature. The vacuum depth required to this end accordingly depends on the temperature of the whey and can be controlled depending on the temperature of the whey, or the curd mass. The second vacuum pressure can for instance be in the order of a few tens of mbar, for instance in the order of 50 mbar. Throughout the curd mass including the core thereof, when the whey starts to boil, a part of the water contained in the whey will evaporate. As a result, the volume of the water increases very strongly, so that all air and free whey is pushed out of the curd mass. The volume increase may be in the order of a factor of 35,000 depending on the vacuum pressure.

If during the first step the valve 11 was not open, it may still be opened, if so desired, after or near the end of the second step. As already described above, the membrane 8 then exerts pressure on the follower 24, and the curd mass in the cheese mold is compressed. The valve 11 then remains open also during the third step to be described below.

In the following step, the vacuum is maintained for a particular period of time, which depends on the type of cheese and on the size of the cheese block to be produced. If the valve 11 was not open during the second step, it is presently to be opened. As already described above, the membrane 8 then exerts pressure on the follower 24, and the curd mass in the cheese mold is compressed. In this third step, which normally lasts longest of the steps mentioned, the curd particles can adhere to each other and fuse and a stable rind can be formed. Admitting the atmospheric pressure via the valve can be done in one step but depending on the type of cheese may also be carried out in several steps. In the first case, the maximum pressing pressure is available directly. In the second case, the pressing pressure is built up stepwise. To this end, air having a lower pressure than the atmospheric pressure may be admitted to the space 9. In this way, for instance a less firm or less deep rind formation may be obtained. If so desired, the end pressure may also be augmented by admitting air having a higher pressure than the atmospheric pressure. If so desired, the maximum pressing force at atmospheric pressure may also be reduced by reducing the membrane surface with respect to the surface of the cover and/or curd mass.

After the boiling point of the whey has been reached, the valve 14 could be closed and the vacuum pump switched off. The vacuum depth then does not change significantly anymore. It is also possible, however, to keep the vacuum pump switched on for the residual part of the second step and if desired at least a part of the period of time mentioned. The vacuum pump then continues to actively exhaust the water vapor formed by boiling. This promotes further evaporation of water and allows still more vapor to be removed. In this way, the moisture content of the cheese can be controlled.

After in the third step a certain extent of rind formation has taken place, in a fourth step the vacuum depth is reduced to a value that is above the boiling limit. The residual water vapor in the curd mass then condenses and the volume thereof is strongly reduced. The reduction factor is of the same order as the expansion factor indicated for the second step. The sudden volume reduction of the water vapor gives rise to implosion phenomena in the curd mass, causing the curd mass to contract internally, so that the curd mass is further compacted.

The pressing treatment may thereafter be continued by maintaining the vacuum depth for some more time or reducing it gradually, which may or may not be done in steps. The pressing treatment is ended by removal of the vacuum. Reducing, or removing, the vacuum may for instance be effected by admitting air under atmospheric pressure (ambient air) via the pipe 12 and the valve 14.

The thus obtained cheese block can then be taken out of the cheese mold, after the cheese mold itself has been taken from the holder. If via the openings in the walls of the cheese mold the atmospheric pressure is already being exerted on the surface of the cheese block while in the interior of the cheese block still a reduced pressure prevails, and the process of condensation of trapped vapor is still in progress, with the original vapor volume being taken up by the cheese mass, the cheese block is somewhat pressed off and pulled loose from the cheese mold. As a result, the cheese block comes off the walls of the cheese mold and can be removed from the cheese mold without the conventional aids such as a vacuum suction cup or compressed air.

It is possible to automate the method described. To this end, the valves 11 and 14 and the vacuum pump 15 may be designed to be controllable, for instance electrically, and be connected with a control device 25, for instance a microprocessor, which controls the valves and the vacuum pump according to a predetermined time schedule and predetermined control settings. Also pressure gauges 26, 27 may then be provided which, for instance, measure the pressure in the space 13 in the holder and in the air chamber 9 and which are also coupled with the microprocessor 25.

An important advantage of the method described is that separate mechanical pressing is no longer necessary. For the pressing treatment, advantageously, use can be made of the considerable pressure difference, already created by the vacuum treatment anyhow, between the environment and the interior of the holder. Nonetheless, it is possible, if desired, to exert the required pressing force wholly or partly mechanically.

Another important advantage is that the pressing treatment described takes only a relatively short time.

Based on experiments, it is expected that the process described needs to take up only a short period of time of, for instance, about 15 minutes for Gouda cheese and comparable types of cheese. Creating the vacuum during the first step and removing the free whey through the thrust of water vapor need to last only a few seconds within that period of time. Furthermore, the cheese molds no longer need to be transported to separate mechanical pressing stations.

Further, the quality of the end product can more easily be monitored and where necessary adjusted, owing to the cycle time being short. Thus, for instance, the end weight of the cheese block is already known after about 15 minutes in the case of Gouda cheese, so that the setting of the dosing unit defining how much curd is deposited in the cheese mold can be changed relatively fast if necessary. This period of time can even be minimized to tens of seconds if the egressing whey with the air and vapor is discharged from the holder via pipe 12 and the open valve 14 and is separated before vacuum device 15. The weight of the separated whey can be determined and compared with the filling weight of the curd deposited in the cheese mold. Based on the separated amount of whey, a very accurate prediction of the end weight of the cheese block is possible. This makes it possible to control the dosing of the curd mass to be deposited in a cheese mold in order to obtain a cheese block having a predetermined desired weight. A whey separator is schematically shown in FIG. 1 at 28.

Also the moisture content may be controlled simply and quickly by adjusting where necessary the time during which the vacuum pump remains in operation during the third step.

Furthermore, it has been found that in the use of the method according to the invention the chance of air or whey inclusions occurring in the cheese to be produced is significantly lower than in existing methods. Also, it appeared that the method according to the invention is little susceptible to the common cheese defects in known production processes as a result of, for instance, disturbances of time or agglutinations of curd parts, however caused.

Finally, the quality of the whey released is relatively high, because it is collected directly in the holder and resides in it only briefly. The whey can therefore be processed sooner and cannot come into contact with parts of a mechanical pressing apparatus.

Figure 2:
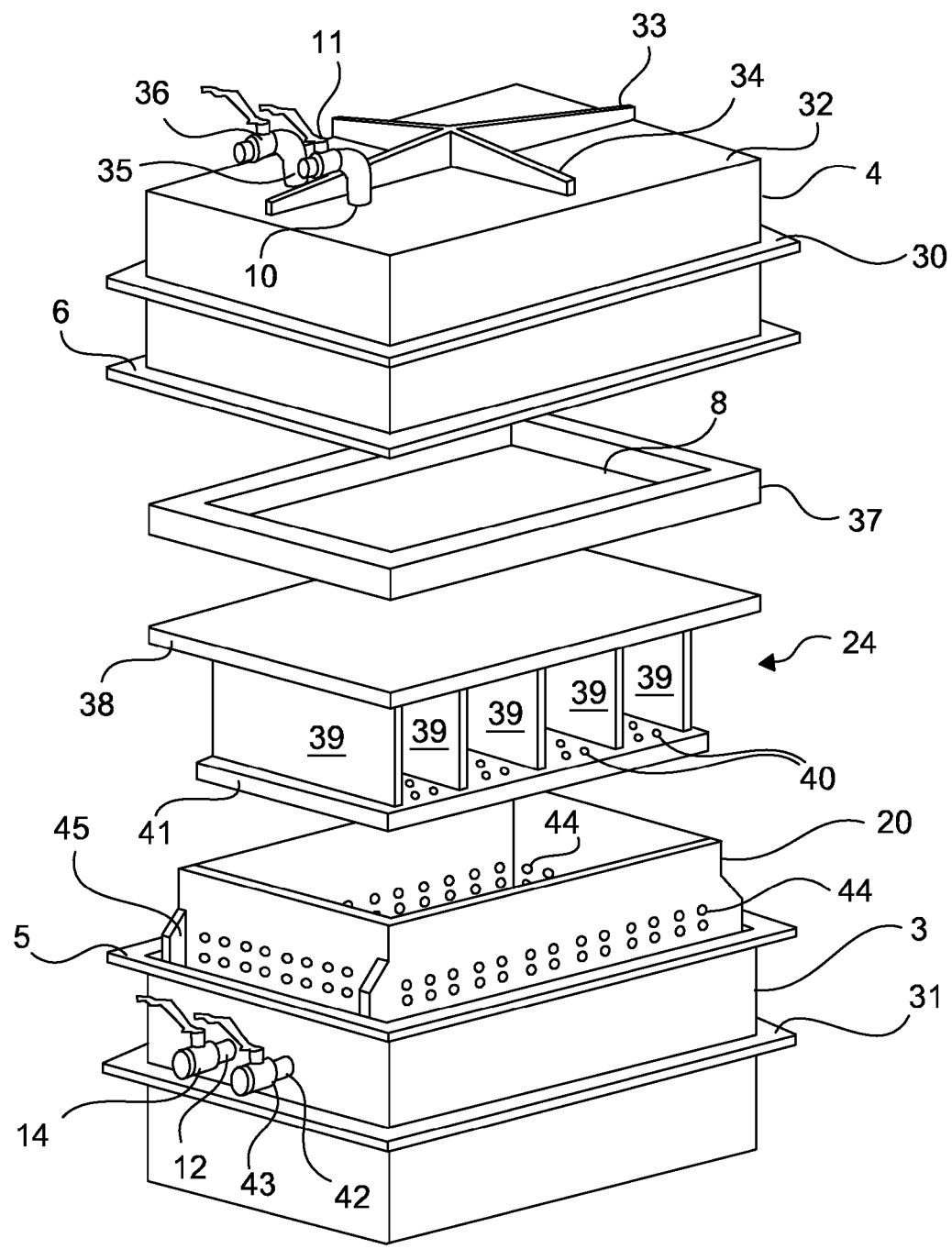
FIG. 2 schematically shows in exploded perspective view a similar apparatus to FIG. 1.

FIG. 2, for the sake of completeness, schematically shows in exploded perspective view an example of a practical design of a holder for use of a method according to the invention. The reference numerals used in FIG. 2 correspond to those of FIG. 1 for corresponding parts.

In the exemplary embodiment shown in FIG. 2, the holder 3 and the cover 4 are each provided with a circumferential strengthening rib 30 and 31, respectively. The outwardly bent edges 5 and 6 also have a strengthening effect. Further, in this example, on the upper wall 32 of the cover 4, strengthening ribs 33, 34 are provided in the form of a cross.

The cover in this example, provided with a pipe 10 with gas valve 11, is additionally provided with a second pipe 35 with an operable valve 36, via which the air chamber 9, if so desired, can be vacuumized rapidly.

The flexible membrane 8 in the example shown is provided with a mounting edge 37 for mounting the membrane in the cover 4. If desired, the mounting edge could be so designed that it can slide up and down in the cover over a limited distance. The follower 24 conventionally has a plate 38 situated outside the cheese mold, which is connected by partitions 39 with a press platform 41 provided with perforations 40.

The holder 3 provided with the vacuum pipe 12 including gas valve 14 is additionally provided with a second pipe 42 including an operable gas valve 43 to allow ambient air or, if desired, compressed air to be rapidly supplied to the inner space 13 of the holder.

Disposed in the holder 3 is the cheese mold 20 having perforated walls provided in a conventional manner with openings 44. The cheese mold in this example is provided with ribs 45 functioning as spacers, which prevent displacement of the cheese mold within the holder.

It is noted that after the foregoing, many variants or modifications of the apparatus described will readily occur to those skilled in the art. Thus, the flexible membrane in the cover could for instance have the form of an inflatable balloon, attached to the cover only adjacent the opening of the balloon. The pipes 10 and 35 should then terminate within that opening.

Also, the holder itself could consist wholly or largely of a flexible, stretchable or not stretchable, airtight material. An example of such a holder is shown in outline in FIG. 3. FIG. 3 again shows a cheese mold 20 with a follower 24 and a curd mass 22 in the cheese mold. The cheese mold is disposed in a balloon-shaped holder 50 of flexible airtight material, as for instance a plastic foil.

Figure 3:
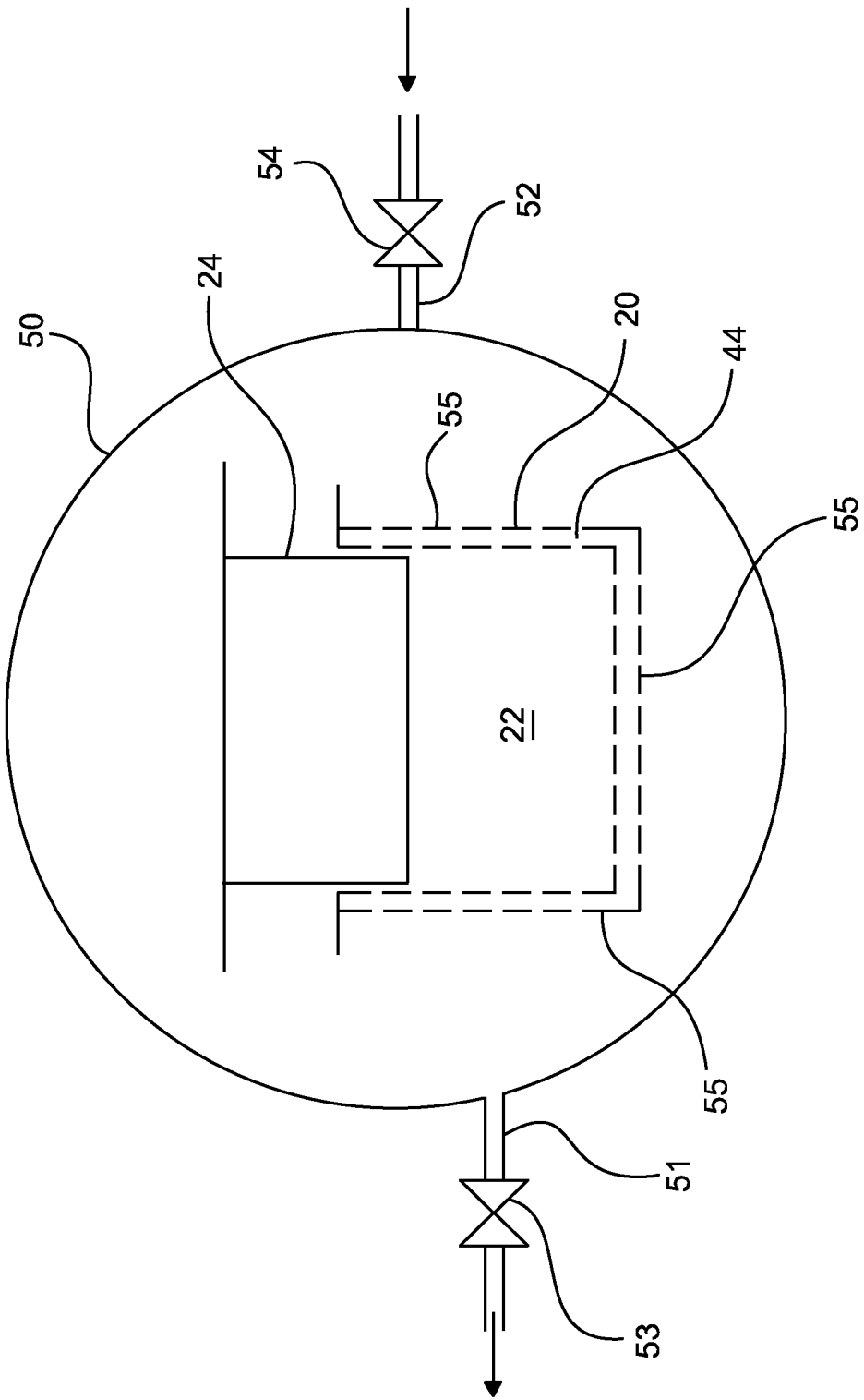
FIG. 3 shows in outline an example of a variant of the apparatus of FIG. 1.

The balloon 50 is provided with a connection 51 for a vacuum pump and with a connection 52 for air supply. The vacuum connection 51 is provided with a suitable valve 53 and the air connection 52 is provided with a valve 54. If the balloon 50, with the valve 54 closed and valve 53 opened, is vacuumized, the flexible material of the balloon 50 will come to lie against the cheese mold and exert pressure on the follower. As a result, the curd mass 22 is compressed. The vacuum can be removed quickly by opening the valve in the air connection or even supplying compressed air. The balloon should be provided with a sufficiently large access opening to allow the cheese mold to be placed in the balloon or removed therefrom. The access opening may for instance be formed by a flap, which can be opened and closed. The cheese mold should furthermore be at least partly double-walled to prevent the flexible material from closing off the perforations 44 in the walls, which would prevent whey and air from egressing from the curd. Such double walls are indicated in FIG. 3 at 55. Alternatively, a wall with internal air and whey channels could be used.

The exemplary embodiments of apparatuses according to the invention shown in the drawing are arranged to receive a single cheese mold, or a single multiple cheese mold, but evidently the holder may simply be designed such that several cheese molds can be simultaneously treated therein.

Furthermore, as already noted, a cheese mold having a movable bottom or sidewall(s) may be used. A holder of hard material should then have an adapted form with one or more gastightly closable sidewalls or a gastightly closable bottom or parts of the sidewalls or bottom via which the cheese mold can be placed in the holder and taken out of the holder.

These and similar modifications are understood to fall within the framework of the invention.

The invention claimed is:

1. A method for producing blocks of cheese from curd, wherein a curd mass is deposited in at least one cheese mold provided with a movable cover and in the at least one cheese mold is subjected to a vacuum treatment and pressing treatment, which pressing treatment is carried out while the at least one cheese mold is situated in a holder in which a vacuum prevails, wherein the vacuum treatment comprises at least a first and a second step, wherein in the first step in the holder with the aid of vacuum pump means a vacuum with a first vacuum pressure is created to draw air and whey entrained with the air from the curd mass, and during the second step the vacuum pressure in the holder is reduced further to a second vacuum pressure, which has at least a value at which the whey present in the curd mass starts to boil and residual air and free whey are pushed from the curd mass.

2. A method according to claim 1, wherein the vacuum pressure at which the whey starts to boil is controlled depending on the temperature of the whey or curd mass.

3. A method according to claim 2, wherein in a third step the vacuum pressure which has been achieved in the second step is maintained for a settable period of time for forming a rind.

4. A method according to claim 3, wherein the vacuum pump remains switched on for a part of the second step remaining after the boiling point has been reached and if desired at least a part of the third step to control the moisture content of the cheese to be produced.

5. A method according to claim 3 or 4, wherein at least during the third step a pressing force is exerted on the movable cover via a flexible wall of the holder in that the outside of the flexible wall is stepwise exposed to the atmospheric pressure and thereby bringing about a building-up pressing force on the movable cover of the cheese mold present in the holder and the curd mass included therein.

6. A method according to claim 5, wherein the pressing force provided by the flexible wall is exerted already during or after the first step.

7. A method according to claim 3, wherein when in the third step a certain extent of rind formation has taken place, in a fourth step the vacuum in the holder is reduced to a value that is above the boiling limit, whereby the vapor present in the curd mass condenses and the volume thereof is strongly reduced so that the curd mass contracts when the curd mass takes up the place of the condensing vapor.

8. A method according to claim 7, wherein after the fourth step the pressing treatment is continued for a desired period, at the end of which the vacuum is removed and the cheese block is taken out of the mold.

9. A method according to claim 8, wherein during the continuation of the pressing treatment the vacuum is reduced gradually and/or in steps.

10. A method according to claim 1, characterized in that the weight of the separated whey is compared with the weight of the curd mass deposited in a cheese mold and that on the basis thereof the weight of the eventual cheese block is determined and the filling weight of a next cheese mold is controlled to obtain a cheese block having a predetermined desired weight.

11. A method according to claim 8, characterized in that a formed cheese block is taken from the cheese mold at a time when after the removal of the vacuum in the interior of the cheese block a reduced pressure still prevails and the process of condensation of vapor bubbles remains in progress so that the cheese block detaches itself from the cheese mold.

* * * * *